Feb. 8, 1966 A. G. ASAFF 3,233,906

STYLUS DRIVER FOR A PHONOGRAPH

Filed April 1, 1963

INVENTOR:
ANNIS G. ASAFF,

BY Donald N. Timbie
HIS ATTORNEY.

United States Patent Office 3,233,906
Patented Feb. 8, 1966

3,233,906

STYLUS DRIVER FOR A PHONOGRAPH

Annis G. Asaff, Newton, Mass., assignor to General Electric Company, a corporation of New York Filed Apr. 1, 1963, Ser. No. 269,437
6 Claims. (Cl. 274—37)

This invention relates generally to a phonograph pickup, and more particularly, to a phonograph pickup, such as the type pickup having two or more styli adapted to follow in differently dimensioned record grooves. In phonograph pickups, the stylus that rides in the record groove is mounted on what is known as a drive rod and the latter serves to transmit the motion of the stylus to the portion of the pickup that generates corresponding variations in voltage or current. This invention relates specifically to an improved drive rod construction.

In order to obtain the best reproduction of a record, the angle of the stylus with respect to the plane of the record must be held within extremely close tolerances. In general, the axis of the stylus should be perpendicular to the plane of the record and not deviate therefrom by more than two degrees.

Accordingly, it is an object of this invention to provide an improved drive rod in which these tolerances can be more easily attained in mass production.

It is another object of this invention to provide a drive rod that retains its critical dimensions better than drive rods of the prior art.

Variations in the designs of phonograph pickup cartridges result in drive rods having different angles with respect to the record when the cartridge is mounted in standard tone arms, thus requiring that the angle of the stylus with respect to the drive rod be changed in order that the stylus be perpendicular to the plane of the record. In some prior art constructions, the length of the drive rod must be altered in order to accommodate the various cartridges.

Accordingly it is another object of this invention to provide a drive rod construction which is very flexible in application in that it can be used with various cartridge designs.

In some prior art constructions, the angle of each stylus mounted on the drive rod is practically determined once the drive rod has been formed, and variations in the angle are achieved with considerable difficulty. Thus, slight variations between one drive rod and another make the attainment of a proper stylus angle extremely difficult to do in mass production.

It is another object of this invention to provide an improved drive rod construction that permits the mounting at one end thereof of two styli extending in opposite directions while still retaining the important advantages enumerated above.

It is still another object of this invention to provide a drive rod construction whereby the angle of the stylus may be held to close tolerances even in the presence of variations between drive rods.

Some drive rod constructions require that the angle of the styli mounted thereon be controlled by the angle of holes in which the styli are mounted. It has been found in practice that this is difficult to do in production.

Accordingly, it is an object of this invention to provide a drive rod construction in which the angle of the styli is controlled by other and improved means which are more amenable to production techniques.

In many, if not most, drive rods, rigidity is attained by forming the drive rod from hollow cylindrical tubes. The end to which the styli are attached is flattened, holes are formed therein and the flattened portion is then formed to its ultimate desired shape. When this series of method steps are used, it will be found that the relative movement between the top and bottom of the flattened end is such that the holes in the top and bottom are no longer precisely aligned, thus causing the stylus to cant over at an angle which is difficult to control with exactitude. In some cases difficulty is experienced in mounting the styli.

Another object of the invention is, therefore, to provide a drive rod construction in which this relative movement of stylus supporting portions of the rod is minimized.

Briefly, the above objectives may be achieved in accordance with this invention by curving the end of the drive rod to which the styli are attached.

The manner in which the above objectives may be achieved in accordance with this invention will be considered in more detail in connection with the drawings in which.

Figure 1:
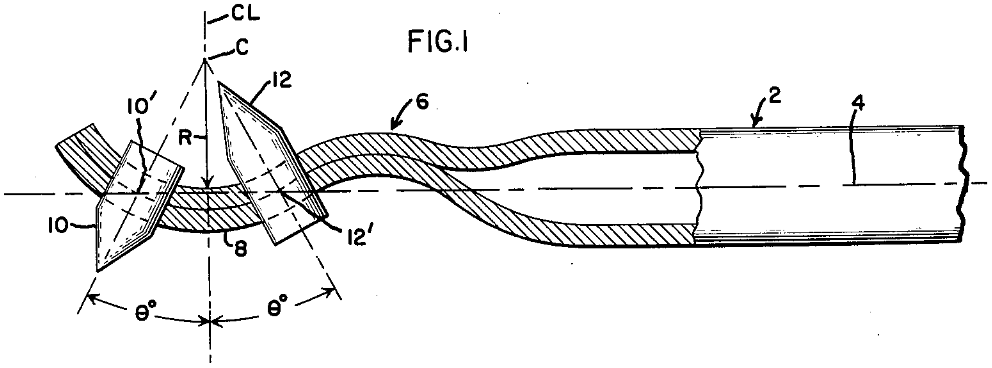
FIGURE 1 is a side view, partially in section, of a drive rod constructed in accordance with this invention and formed from a hollow cylinder.
Figure 2:
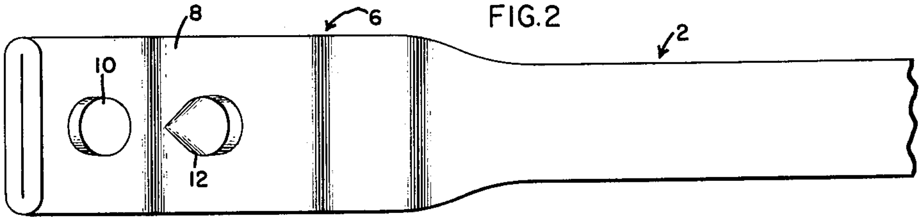
FIGURE 2 is a top view of FIGURE 1.

FIGURES 1 and 2 show a drive rod constructed in accordance with a first embodiment of this invention from hollow cylindrical stock. In this particular embodiment, the drive rod is comprised of a straight shank portion 2 having an axis as indicated by the dash-dot line 4. Just to the left of the shank (viewing FIG. 1) is an intermediate section 6 in which the rod is gently curved upward and then back downward before leading into the desired curvature of the end 8 in which styli 10 and 12 are mounted. The bend in the intermediate section 6 permits the mounting centers 10′ and 12′ of the styli 10 and 12 to be located on the axis 4, as is generally required for best sound reproduction.

It will be noted that the curvature of the end 8 is shown as having an internal radius R about a center C and that the styli 10 and 12 will have the same angle with respect to the axis 4 if they are mounted an equal distance along axis 4 from a point where the center line CL intersects the axis 4, the center line CL being a line perpendicular to the axis 4 from the center of curvature C. If it is desired to use the formed drive rod with a phonograph pickup or cartridge on which the shank 2 is mounted with a different angle, it is only necessary that the distance from center line CL of the holes in which the styli 10 and 12 are mounted be formed at equally greater or equally less distances from the center line CL. This feature of the construction also permits the styli to be mounted at a desired angle in the presence of slight differences in drive rod configurations.

Figure 3:
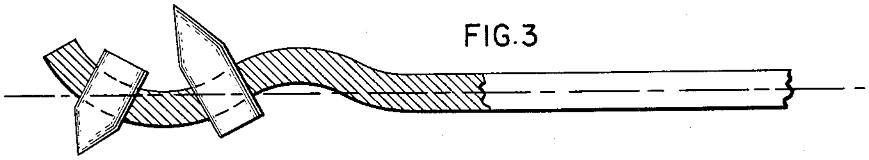
FIGURE 3 is a side view, partially in section, of a drive rod constructed in accordance with this invention and formed from solid stock.
Figure 4:
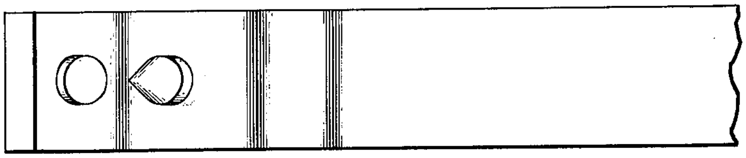
FIGURE 4 is a top view of FIGURE 3.

FIGURES 3 and 4 illustrate a second embodiment of my invention wherein a drive rod is formed from stock of rectangular cross section. The advantages noted above for the first described embodiment again apply for this alternative embodiment.

Inasmuch as the relative movement between metal on the inside and outside, respectively, of a curved section 8 (e.g. the top and bottom portions of curved section 8, as shown in FIG. 1) depends on the difference in the change in the lengths of these sections when the curved section 8 is formed by a die, such relative movement will be at a minimum. Of course, if the holes are punched after the curved section is formed, the precise relative movement has no effect, but it is possible that stresses set up may subsequently cause a relative movement.

Figure 5:
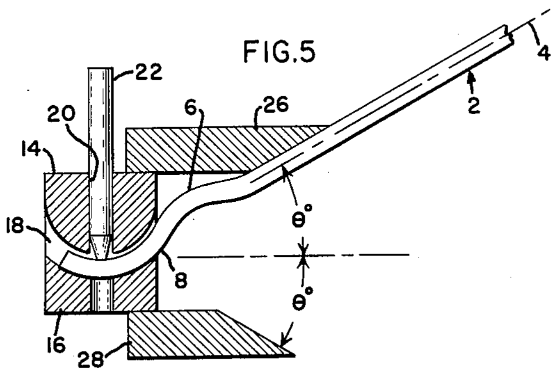
FIGURE 5 illustrates, in accordance with the teaching of my invention, how holes in which the styli are mounted can be formed so that the styli mounted therein will have precise angle with respect to the axis of the drive rod.

Reference is now made to FIGURE 5 for an illustration of the manner in which the drive rod construction of this invention lends itself to precise but rapid production methods. Assuming that the drive rod has been formed and that the mounting holes for the styli 10 and 12 are to be punched, it is only necessary to insert the curved end 8 between top and bottom portions 14 and 16 of a punch die set that is formed so as to present a punch die passage 18 therebetween having substantially the some shape as and being a little larger than the curved end 8. The upper portion 14 of the die defines a cylindrical hole 20 adapted to receive a punch 22, and the lower portion 16 has a cylindrical hole aligned with the hole 20. With the axis of the drive rod horizontal and therefore perpendicular to the axis of the punch 22, the punch would strike the drive rod at the point as the center line C, see FIGURES 1 and 3. If the desired angle of the styli with respect to the center line CL is $\theta°$ as indicated in FIGURES 1 and 2, the punch will form holes at the proper points by rotating the shank portion 2 first to a stop 26 and then to a stop 28. If, by chance, there should be a slight difference from drive rod to drive rod in the relative position of the curved end 8 and the shank 2, in the plane illustrated in FIGURES 1 and 3, the holes for the styli would still have the same angle.

By changing the setting of the stops 26, 28 the angle can be changed to accommodate to some degree the varying angles of the drive rods in differently designed phonograph cartridges. This, of course, results in different spacing between the styli, if two are used, and if this becomes too great from other considerations, it would be necessary to change the radius of curvature of the stylus holding end 8. Nevertheless, construction of the drive rod permits an advantageous range of adjustments to be made.

What I claim is:

1. For use in a phonograph pickup, a drive rod comprising a shank portion having a longitudinal axis, and an end portion connected to said shank portion; and at least one stylus; said end portion of said rod being curved relative to said axis in a plane which includes said axis and crossing said axis twice, said curved end portion having at least one opening formed therein, said opening being formed in said curved end portion of said rod to receive said stylus with the mounting center of said stylus located on said axis.

2. A drive rod as set forth in claim 1 wherein said curved portion has a constant radius about a point in said plane.

3. A drive rod as set forth in claim 2 wherein said stylus is mounted in said curved portion along a radius in said plane.

4. For use in a phonograph pickup, an elongated stylus holder comprising a shank portion having a longitudinal axis, and a substantially flat end portion connected to said shank portion, said end portion of said holder being cylindrically curved relative to said axis in a plane which includes said axis and crossing said axis twice, said end portion having a constant radius about a point spaced from said axis and disposed in said plane, at least two angularly spaced-apart openings formed in said curved end portion, and at least two styli supported by said stylus holder, each of said styli being mounted in an associated one of said openings so that its mounting center is located on said axis.

5. The stylus holder of claim 4 wherein each of the styli is mounted in said curved end portion along a radius of said point disposed in said plane.

6. The stylus holder of claim 5 wherein the mounting center of each of said two styli is located the same distance from a reference line drawn from the axis of curvature of said curved end portion into perpendicular relationship with the longitudinal axis of the holder.

References Cited by the Examiner

UNITED STATES PATENTS

| | | | |
|---|---|---|---|
| 54,580 | 5/1866 | Montgomery | 83—925 X |
| 2,499,196 | 2/1950 | Mencke | 274—38 |
| 2,613,680 | 10/1952 | Rapisarda | 132—50 |
| 2,980,428 | 4/1961 | Blashewski | 274—37 |
| 3,077,521 | 2/1963 | Aherns et al. | 179—100.41 |
| 3,183,311 | 5/1965 | McAlvay | 179—100.41 |

FOREIGN PATENTS

| | | |
|---|---|---|
| 603,600 | 4/1960 | Italy. |
| 137,429 | 9/1952 | Sweden. |

OTHER REFERENCES

German printed application 1,030,053, May 14, 1958, Zimmermann.

NORTON ANSHER, *Primary Examiner*.

W. E. JACKSON, *Assistant Examiner*.